United States Patent
Taira

(10) Patent No.: US 9,973,873 B2
(45) Date of Patent: May 15, 2018

(54) SOUND FIELD CONTROL SYSTEM, ANALYSIS DEVICE, AND ACOUSTIC DEVICE

(71) Applicant: Onkyo Corporation, Osaka (JP)

(72) Inventor: Kazuhiko Taira, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days. days.

(21) Appl. No.: 15/468,552

(22) Filed: Mar. 24, 2017

(65) Prior Publication Data

US 2017/0289727 A1 Oct. 5, 2017

(30) Foreign Application Priority Data

Mar. 30, 2016 (JP) ................................. 2016-068904

(51) Int. Cl.
*H04R 29/00* (2006.01)
*H04S 7/00* (2006.01)
*H04R 5/02* (2006.01)

(52) U.S. Cl.
CPC ............. *H04S 7/301* (2013.01); *H04R 5/02* (2013.01); *H04R 29/001* (2013.01); *H04S 2400/01* (2013.01)

(58) Field of Classification Search
CPC ........ H04R 5/02; H04R 29/00; H04R 29/001; H04S 7/301
USPC ..................................... 381/58–59, 303, 307
See application file for complete search history.

(56) References Cited

U.S. PATENT DOCUMENTS

| 7,428,310 B2* | 9/2008 | Park ........................ H04S 7/301 |
| | | 381/104 |
| 9,451,377 B2* | 9/2016 | Massey .................... G01S 11/14 |
| 2005/0013442 A1 | 1/2005 | Ohta |
| 2007/0086597 A1 | 4/2007 | Kino |

(Continued)

FOREIGN PATENT DOCUMENTS

JP        05-297881        11/1993

OTHER PUBLICATIONS

Extended European Search Report dated Aug. 17, 2017 for corresponding European Application No. 17163413.2.

*Primary Examiner* — Disler Paul
(74) *Attorney, Agent, or Firm* — Renner Otto Boisselle & Sklar, LLP

(57) ABSTRACT

A sound field control system SY according to the present invention is provided with: a signal supply unit 210 which supplies a test signal sequence to a speaker; and an analysis unit 150 which picks up a sound including a test sound sequence emitted from a speaker based on a test signal sequence using a microphone, and which determines the sound pickup time of an initial test sound among test sounds included in the test sound sequence, wherein the analysis unit 150 detects the initial sound from the sound pickup signal picked up using the microphone, determines whether a sound is detected after the elapse of a sound emission interval, from the sound pickup time of the detected initial sound, between the initial test sound defined by the test signal sequence and an n-th (where n is an integer such that n≥2) test sound emitted from the same speaker as the initial test sound, and, upon determining that the sound has been detected, determines the sound pickup time of the initial sound as the sound pickup time of the initial test sound.

10 Claims, 8 Drawing Sheets

(56) References Cited

U.S. PATENT DOCUMENTS

2012/0063605 A1    3/2012  Tawada
2013/0058492 A1*  3/2013  Silzle .................... H04R 5/027
                                                  381/59

\* cited by examiner

SOUND FIELD CONTROL SYSTEM, ANALYSIS DEVICE, AND ACOUSTIC DEVICE

BACKGROUND OF THE INVENTION

1. Field of the Invention

The present invention relates to a sound field control system for performing sound field control of an acoustic device, an analysis device, an acoustic device, a sound field control system control method, an analysis device control method, an acoustic device control method, a program, and a recording medium.

2. Description of the Related Art

An example of the related art is known from JP-A-5-297881. JP-A-5-297881 discloses a sound image localization device that supplies a test signal to a plurality of speakers for emitting test sounds, picks up the test sounds using a microphone placed at a sound image localization position, and detects the peak point of each sound pickup signal. In this way, the sound image localization device measures the sound arrival time from each speaker, and delays a voice signal to be output to each speaker by a time inversely proportional to the sound arrival time. Accordingly, in JP-A-5-297881, sound field control is performed to eliminate the delay of sound due to variations in the distance from each speaker to the microphone, providing the effect that a setup adapted to the speaker installation environment can be easily implemented, for example.

SUMMARY OF THE INVENTION

According to the conventional technology such as JP-A-5-297881, when the test sound pickup timing is detected, the detection is made based solely on the signal level of the sound pickup signal. Accordingly, if unintended noise enters, the noise may be erroneously detected as a test sound. As a method for decreasing such noise, synchronous addition is known whereby the test sound is emitted multiple times and picked up, and the pickup signals are added up at the same timing to increase S/N. In order to perform synchronous addition, it is necessary to accurately determine the sound pickup time of the initial test sound of the test sound, which is emitted multiple times. In the conventional technology such as according to JP-A-5-297881, the acoustic device that emits the test sound and the microphone that picks up the test sound are disposed in the same device. In addition, with regard to the initial test sound, the sound pickup time can be accurately determined from the time of sound emission. Accordingly, the possibility of erroneously detecting the sound pickup time of the initial test sound due to noise is low. However, sound pickup may be performed using a device, such as a smartphone (a smartphone-mounted microphone), that is separate from the acoustic device which emits the test sound. In this case, the sound emission timing of the test sound cannot be identified, resulting in a failure to accurately measure the sound pickup time of the initial test sound. In particular, when the device separate from the acoustic device is connected via wireless communication, communication delay may be caused by routing, retransmission or the like. In this case, the determination of the sound pickup time is made even more difficult.

Meanwhile, accurate determination of the sound pickup time of the initial test sound is important not only for the sound field control for eliminating the delay of sound, but also during the measurement of speaker frequency characteristics and the like. That is, there is a need for a technique which enables accurate measurement of the sound pickup time of the initial test sound when a test sound sequence emitted from a speaker is picked up to perform various measurements.

In view of the aforementioned problem, an object of the present invention is to provide a sound field control system, an analysis device, an acoustic device, a sound field control system control method, an analysis device control method, an acoustic device control method, a program, and a recording medium which enable accurate measurement of the sound pickup time of the initial test sound when a test sound sequence emitted from a speaker is picked up to perform various measurements.

A sound field control system according to a preferred embodiment of the present invention comprising: a signal supply unit for supplying a test signal sequence to a speaker; and an initial test sound pickup time determination unit for picking up a sound including a test sound sequence emitted from the speaker based on the test signal sequence, using a microphone, and determining the sound pickup time of an initial test sound among test sounds included in the test sound sequence, wherein the initial test sound pickup time determination unit detects an initial sound from a sound pickup signal picked up with the microphone, determines whether a sound has been detected after the elapse of a sound emission interval, from the sound pickup time of the detected initial sound, between the initial test sound defined by the test signal sequence and an n-th (where n is an integer such that n≥2) test sound emitted from the same speaker as the initial test sound, and, upon determining that the sound has been detected, determines the sound pickup time of the initial sound as the sound pickup time of the initial test sound.

Preferably, wherein the initial test sound pickup time determination unit, upon determining that no sound has been detected after the elapse of the sound emission interval, from the sound pickup time of the detected initial sound, between the initial test sound and the n-th test sound, determines a sound detected next to the initial sound as new initial sound.

Preferably, wherein the initial test sound pickup time determination unit, with respect to the speaker which emits the initial test sound, determines whether a sound has been detected after the elapse of the sound emission interval, from the sound pickup time of the final test sound defined by the test signal sequence, between the final test sound and a preceding test sound, and, upon determining that the sound has been detected, determines the sound detected next to the initial sound as a new initial sound.

Preferably, wherein the test signal sequence is configured to cause a plurality of the speakers to emit the test sound x times each (where x is an integer such that x≥2), the sound field control system further comprising: a synchronous addition unit which, with reference to the sound pickup time of the initial test sound determined by the initial test sound pickup time determination unit, performs synchronous addition for each of the speakers, using at least some of sound pickup results of the test sound emitted x times; and a signal processing unit which performs a delay process for a voice signal supplied to each of the speakers, using an addition result from the synchronous addition unit.

Preferably, comprising: a time difference calculation unit which compares information indicating a sound emission timing of the test signal sequence with a sound pickup timing of each test sound that is obtained from the addition result from the synchronous addition unit and that has been subjected to synchronous addition for each of the speakers, to calculate a time difference between the sound emission timing and the sound pickup timing of each test sound, wherein the signal processing unit performs the delay process based on the time difference calculated by the time difference calculation unit.

Preferably, wherein the test signal sequence is a signal sequence for emitting the test sound at regular intervals.

Preferably, wherein the time difference calculation unit, with reference to a point in time preceding the sound pickup time of the initial test sound by a predetermined time, calculates a time difference between a time length from a start point of each of divided intervals which are set at the regular intervals to the sound pickup time of each test sound and the predetermined time.

Preferably, comprising: an analysis device which includes the initial test sound pickup time determination unit, the synchronous addition unit, and the time difference calculation unit; and picking up the sound including the test sound sequence using the microphone and an acoustic device including the signal supply unit and the signal processing unit, wherein the analysis device and the acoustic device are connected via wireless communication.

Preferably, An analysis device comprising: a sound pickup unit which picks up a sound including a test sound sequence emitted from a speaker based on a test signal sequence, using a microphone; and an initial test sound pickup time determination unit which, from a sound pickup result from the sound pickup unit, determines a sound pickup time of an initial test sound among test sounds included in the test sound sequence, wherein the initial test sound pickup time determination unit detects the initial sound from a sound pickup signal picked up with the microphone, determines whether a sound has been detected after the elapse of a sound emission interval, from the sound pickup time of the detected initial sound, between the initial test sound defined by the test signal sequence and an n-th (where n is an integer such that n≥2) test sound emitted from the same speaker as the initial test sound, and, upon determining that the sound has been detected, determines the sound pickup time of the initial sound as the sound pickup time of the initial test sound.

Preferably, An acoustic device comprising: a signal supply unit which supplies a test signal sequence to a speaker; and an initial test sound pickup time determination unit which, from sound pickup result of picking up a sound including a test sound sequence emitted from the speaker based on the test signal sequence using a microphone, determines a sound pickup time of an initial test sound among test sounds included in the test sound sequence, wherein the initial test sound pickup time determination unit detects the initial sound from a sound pickup signal picked up with the microphone, determines whether a sound has been detected after the elapse of a sound emission interval, from the sound pickup time of the detected initial sound, between the initial test sound defined by the test signal sequence and an n-th (where n is an integer such that n≥2) test sound emitted from the same speaker as the initial test sound, and, upon determining that the sound has been detected, determines the sound pickup time of the initial sound as the sound pickup time of the initial test sound.

DETAILED DESCRIPTION OF THE PREFERRED EMBODIMENTS

Figure 1:
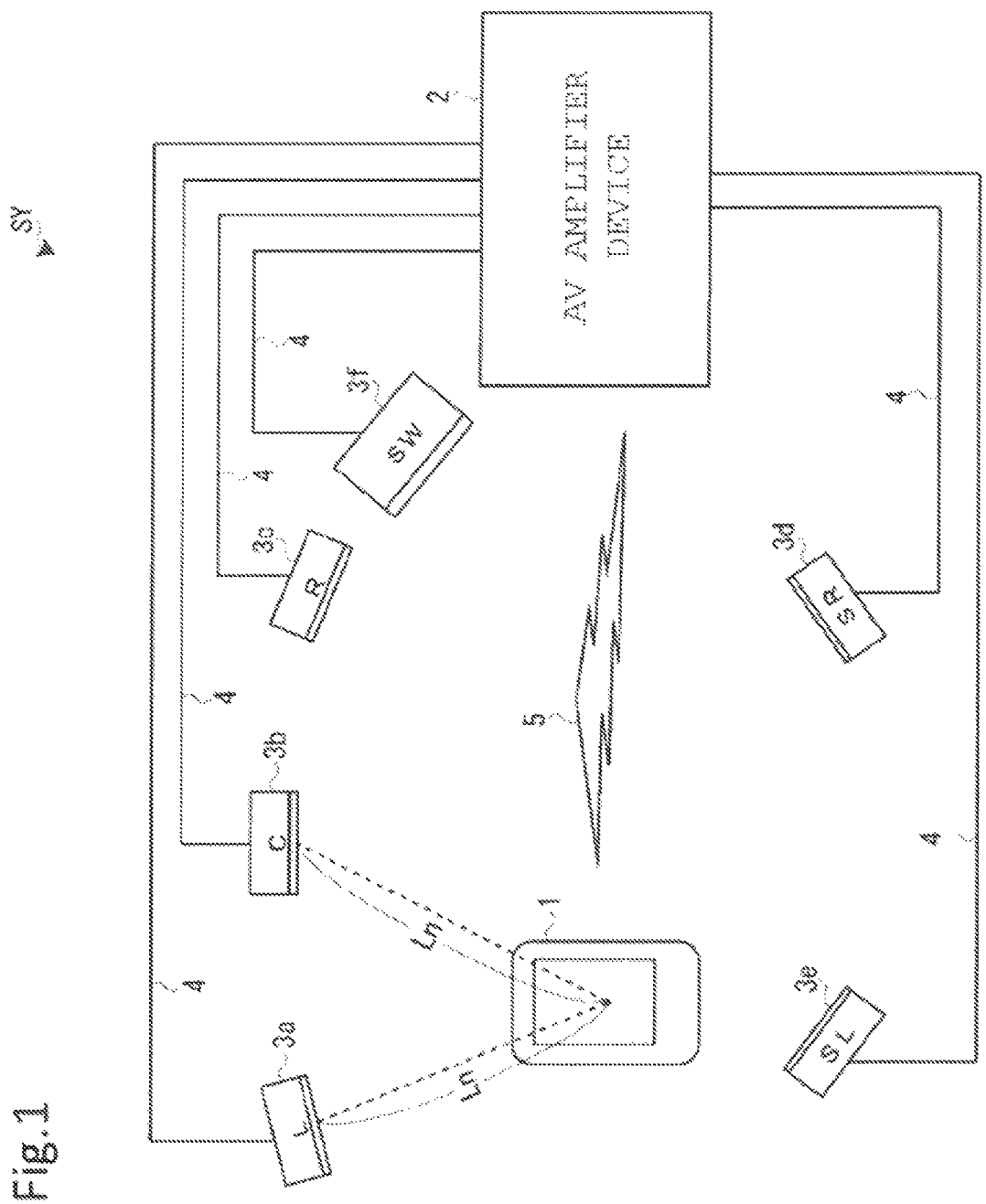
FIG. 1 is a system configuration diagram of a sound field control system.

In the following, a sound field control system, an analysis device, an acoustic device, a sound field control system control method, an analysis device control method, an acoustic device control method, a program, and a recording medium according to an embodiment of the present invention will be described with reference to the attached drawings. FIG. 1 is a system configuration diagram of a sound field control system SY. The sound field control system SY is provided with a smartphone 1 (analysis device); an AV amplifier device 2; and a speaker group 3 (3a to 3f). The "acoustic device" in the claims refers to the AV amplifier device 2 and the speaker group 3.

The smartphone 1 and the AV amplifier device 2 are connected via wireless communication 5, such as Bluetooth (registered trademark) or a wireless local area network (LAN). The AV amplifier device 2 and the speakers 3a to 3f are connected via wired communication 4, such as dedicated cables.

The speaker group 3 of the present embodiment is adapted for 5.1 channels and includes a front-left speaker 3a (L), a front-center speaker 3b(C), a front-right speaker 3c (R), a surround-right speaker 3d (SR), a surround-left speaker 3e (SL), and a subwoofer 3f (SW).

The example illustrated in FIG. 1 is not a limitation, and the number or type of speakers of the speaker group 3 may be selected as desired. The AV amplifier device 2 and the speakers 3a to 3f may be connected via wireless communication. In addition, instead of the smartphone 1, other information processing terminals may be used, such as a tablet terminal, a portable telephone, or a notebook computer. In this case, the AV amplifier device 2 and the information processing terminal may be connected via wired communication in accordance with the communication standard of the information processing terminal.

Figure 2:
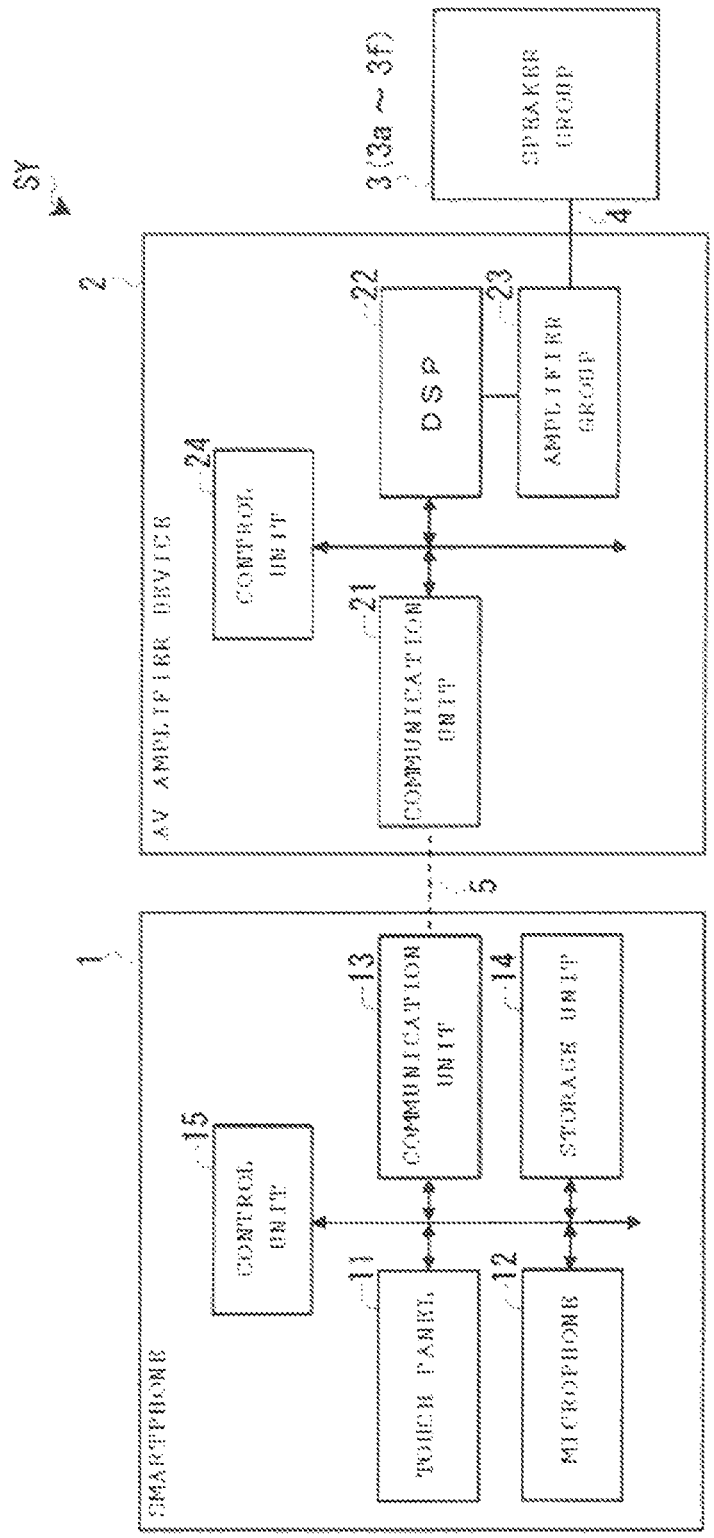
FIG. 2 is a control block diagram of a hardware configuration of the sound field control system.

With reference to FIG. 2, the hardware configuration of the sound field control system SY will be described. The smartphone 1 is provided with a touch panel 11, a microphone 12, a communication unit 13, a storage unit 14, and a control unit 15. The touch panel 11 functions as an operation means and a display means. The microphone 12 picks up a sound (inputs sound wave). The communication unit 13 performs transmission and reception of information with the AV amplifier device 2. The storage unit 14 stores an operating system (OS) and various smartphone applications in a nonvolatile manner. The smartphone applications include a sound field control application for performing sound field control of the AV amplifier device 2. The "sound field control" refers to causing the speakers 3a to 3f to emit test sounds, measuring the test sounds, and performing a delay process on the voice signals supplied to the speakers 3a to 3f based on the measurement result, so that the delay of sound due to the variations in the distance from the speakers 3a to 3f to the listening position (position of the smartphone 1) can be eliminated. The control unit 15 includes a central processing unit (CPU), a random access memory (RAM) and the like, and performs various computing processes, such as sound field control.

The AV amplifier device 2 is provided with a communication unit 21, a digital signal processor (DSP) 22, an amplifier group 23, and a control unit 24. The communication unit 21 performs transmission and reception of information with the smartphone 1. The DSP 22 performs various digital signal processes, such as a voice signal delay process. The amplifier group 23 includes a plurality of amplifiers corresponding to the respective channels (not illustrated). The amplifiers respectively amplify the voice signals for the corresponding channels, and supply the amplified voice signals to the corresponding speakers 3a to 3f. The control unit 24 includes a CPU, a RAM and the like, and performs various computing processes, such as reproduction control. The speaker group 3 emits sounds (outputs sound waves).

Figure 3:
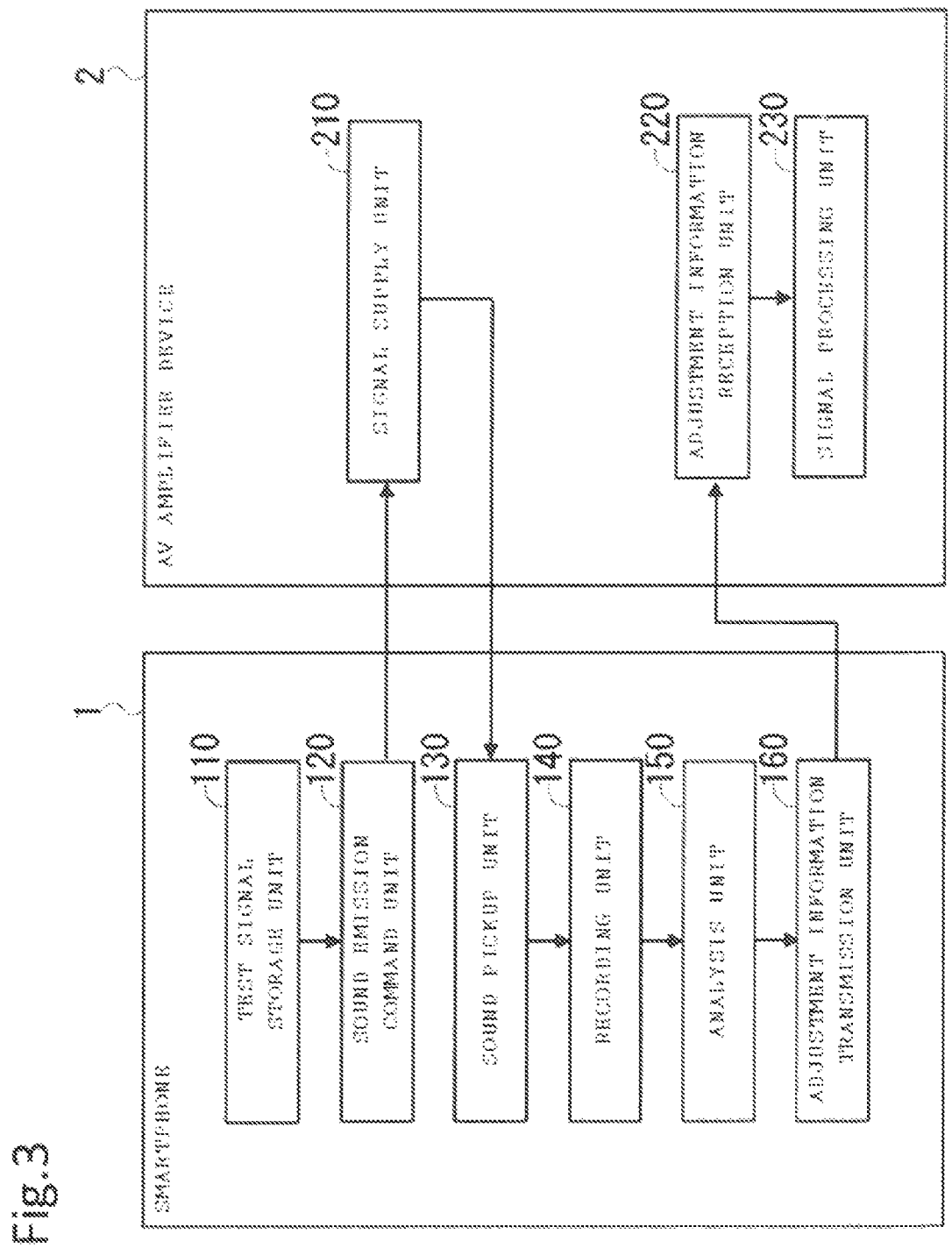
FIG. 3 is a function block diagram of a functional configuration of a smartphone and an AV amplifier device.

With reference to FIG. 3, the functional configuration of the smartphone 1 and the AV amplifier device 2 will be described. The smartphone 1, as a functional configuration, is provided with a test signal storage unit 110; a sound emission command unit 120; a sound pickup unit 130; a recording unit 140; an analysis unit 150; and an adjustment information transmission unit 160. The AV amplifier device 2, as a functional configuration, is provided with a signal supply unit 210; an adjustment information reception unit 220; and a signal processing unit 230. The units 110 to 160 of the smartphone 1 are mainly implemented by the sound field control application.

The test signal storage unit 110 of the smartphone 1 stores a test signal sequence which is used when sound field control is performed. The test signal sequence according to the present embodiment causes a test sound to be emitted from the speakers 3a to 3f at a predetermined timing (predetermined sound emission interval), in a predetermined order, and for a predetermined number of times of repetition. The signal supply unit 210 of the AV amplifier device 2 supplies the test signal sequence to the speaker group 3 (signal supply step). The signal supply unit 210 uses the DSP 22 and the control unit 24 as major units.

Figure 5:
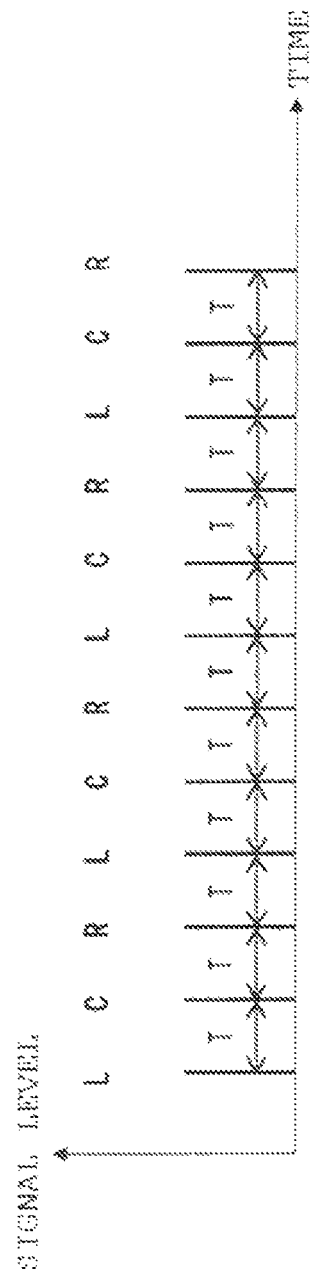
FIG. 5 is a diagram illustrating an example of a test signal sequence supplied to speakers.

FIG. 5 is a diagram illustrating an example of the test signal sequence. In the figure, for ease of description, the test signal sequence is for the case of a 3-channel speaker configuration. According to the illustrated test signal sequence, an operation for emitting the test sound while the speakers 3 are switched in the order of front-left (L), front center (C), and front-right (R) is repeated four times ("x times" in the claims). That is, the test sound is emitted 12 times (the number of speakers×the number of repetitions) in order of L→C→R→L→C→R→L→C→R→L→C→R. In addition, according to the present embodiment, the sound emission interval of the test sound is a constant time T (regular intervals). Accordingly, the sound emission interval for each speaker 3 is 3T. Preferably, as the test sound, a signal of which the signal level changes rapidly, such as an impulse signal, may be used.

The test signal storage unit 110 stores the test signal sequence for each device type or speaker configuration (the number of channels) of the AV amplifier device 2. The sound emission command unit 120, which will be described later, issues a sound emission command using a test signal sequence suitable for the AV amplifier device 2 to which the smartphone 1 is connected. That is, the device type or speaker configuration is determined at the time of establishing connection with the AV amplifier device 2, and the test signal sequence to be used is determined in accordance with the determination result. Alternatively, a configuration may be adopted in which the test signal sequence to be used is determined by the user selecting the device type or speaker configuration.

The sound emission command unit 120 of the smartphone 1 issues a test signal sound emission command to the AV amplifier device 2. According to the present embodiment, instead of the sound emission command being issued for each test signal (test sound), a sound emission command for the test signal sequence (test sound sequence) is issued by a single wireless communication. The signal supply unit 210 of the AV amplifier device 2 supplies the test signal sequence to each of the speakers 3 in accordance with the sound emission command from the sound emission command unit 120.

Figure 6:
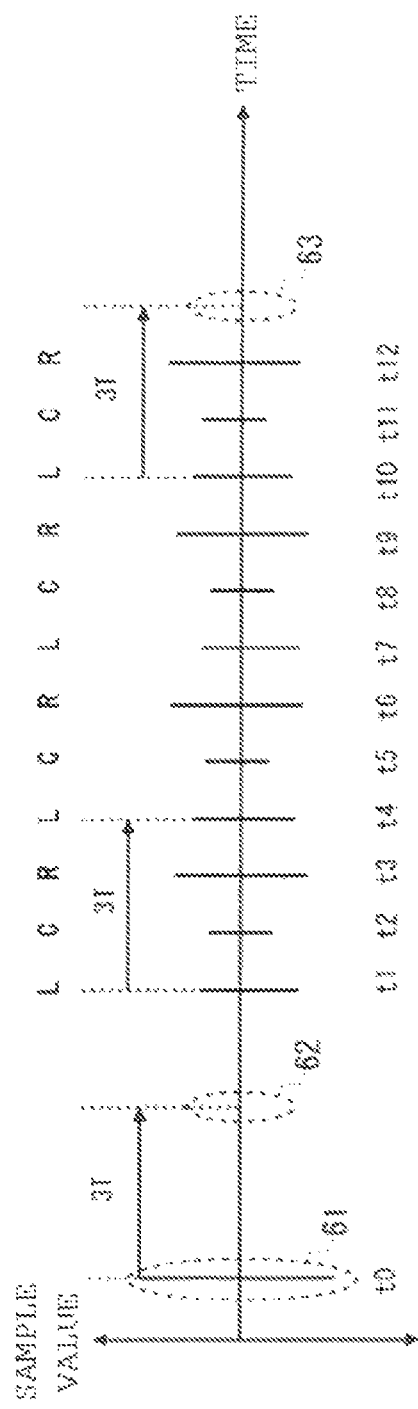
FIG. 6 is a diagram illustrating an example of a measurement result of sound pickup signals picked up using a microphone.

The sound pickup unit 130 of the smartphone 1 picks up the sound of the test sound sequence using the microphone 12 (sound pickup step). The sound pickup unit 130 uses the storage unit 14 (sound field control application) and the control unit 15 as major units. The recording unit 140 of the smartphone 1 records the test sound sequence the sound of which has been picked up by the sound pickup unit 130. FIG. 6 is a diagram illustrating an example of the measurement result of the sound pickup signals picked up with the microphone. The figure illustrates an example in which the test sound sequence based on the test signal sequence illustrated in FIG. 5 has been recorded. In the figure, at t0 to t12, sample values obtained by performing A/D conversion on the recording data recorded by the recording unit 140 are indicated.

Figure 4:
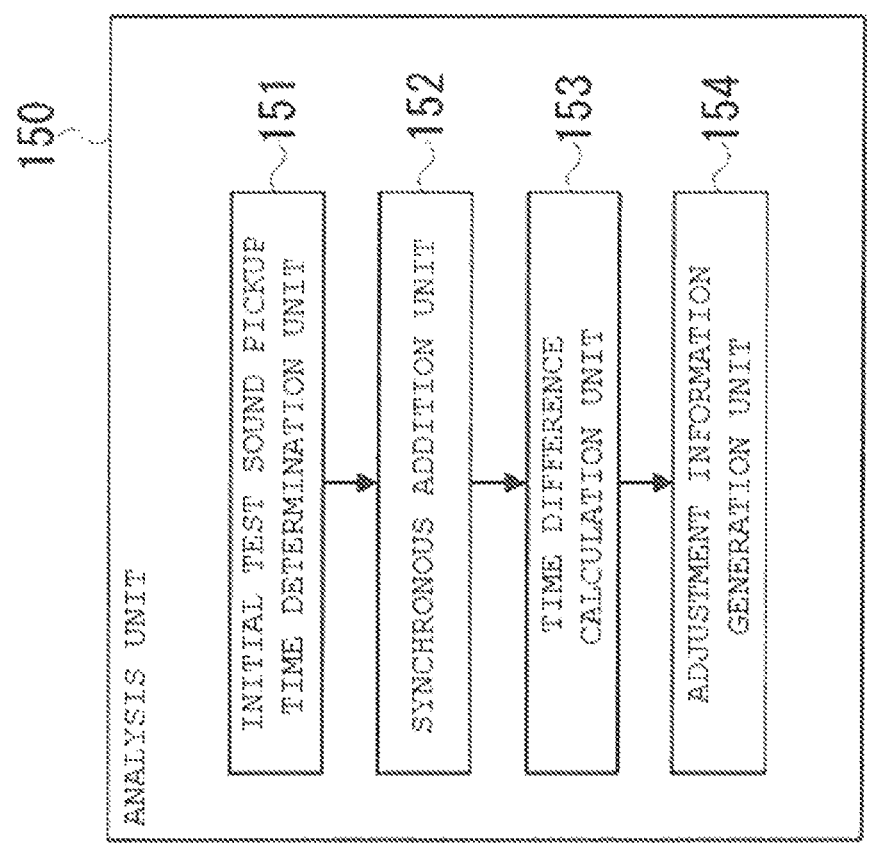
FIG. 4 is a function block diagram of a functional configuration of an analysis unit.

The analysis unit 150 of the smartphone 1 generates adjustment information for sound field control by analyzing the recording data illustrated in FIG. 6. With reference to FIG. 4, the analysis unit 150 will be described in detail. The analysis unit 150 includes: an initial test sound pickup time determination unit 151; a synchronous addition unit 152; a time difference calculation unit 153; and an adjustment information generation unit 154.

The initial test sound pickup time determination unit 151 picks up, using the microphone 12, sound including the test sound sequence emitted from the speakers 3 based on the test signal sequence, and determines the sound pickup time of the initial test sound, which is the initial sound of the test sound included in the test sound sequence (initial test sound pickup time determination step). Specifically, based on the signal level of the sound pickup signals picked up using the microphone 12, the initial sound (the initial sound detected from the sound pickup signals) is detected. It is then determined whether, after the elapse of the sound emission interval for each of the speakers 3 (3T in the present embodiment), and based on the sound pickup time of the detected initial sound, sound (the sound considered to have been emitted from the speakers 3 emitting the initial test sound) has been detected. If it is determined that the sound has been detected, the sound pickup time of the initial sound is determined as the sound pickup time of the initial test sound. This is because, if the relative positional relationship of the speakers 3 and the microphone 12 is unchanged, it can be expected that the test sound will be picked up after the elapse of the sound emission interval for each of the speakers 3. This is based on the prerequisite that the speakers 3 and the microphone 12 are not moved in the period in which the test sound sequence is being picked up using the microphone 12 (i.e., from the start of sound pickup of the test sound sequence and the end of the sound pickup). Meanwhile, if it is determined that no sound has been detected from the sound pickup time of the detected initial sound after the elapse of the sound emission interval for each of the speakers 3, the possibility is high that the detected initial sound is noise. Accordingly, the sound that has been detected next to the initial sound is determined as new initial sound.

For example, in the example of FIG. 6, while sound (a sample value exceeding a predetermined threshold value) is detected at sound pickup time t0 (see the broken-line frame indicated by sign 61), no sound is detected after the sound emission interval 3T from the sound pickup time t0 (see the broken-line frame indicated by sign 62). This indicates a high possibility that the sound detected at sound pickup time t0 is noise. Accordingly, the next-detected sound (at sound pickup time t1) is determined as the new initial sound. With regard to the new initial sound, because the sound is detected after the sound emission interval 3T from the sound pickup time t1 (sound pickup time t4), the sound pickup time t1 is determined as the sound pickup time of the initial test sound.

The determination as to whether a sound has been detected can be made by calculating the effective value (rms) in a certain time of the impulse waveform, whereby a sound can be determined to have been detected if the effective value is greater than a threshold value (for example, the effective value of steady noise). Alternatively, the effective value of an impulse waveform of the detected initial sound may be compared with the effective value of an impulse waveform detected after the sound emission interval 3T, and it may be determined that a sound has been detected only if an error is within a predetermined error range (for example, not more than 10%). In this way, it can be determined whether the sound is the test sound emitted from the same speakers 3 that emitted the initial test sound, whereby the initial test sound can be determined with increased accuracy.

However, the initial test sound pickup time determination unit 151, even after determining the sound pickup time of the initial test sound based on the determination of the initial test sound, repeats the initial test sound determination if the determination is determined to be inappropriate based on the determination of the final test sound. Specifically, with regard to the speakers 3 which emit the initial test sound, it is determined whether, after the elapse of the sound emission interval for each of the speakers 3 (3T in the present embodiment) from the sound pickup time of the final test sound defined by the test signal sequence, a sound (which is considered to have been emitted from the speakers 3 emitting the initial test sound) has been detected. If it is determined that the sound has been detected, the possibility is high that the initial test sound that has once been determined is noise. Accordingly, the sound detected next to the initial sound is determined as the new initial sound.

For example, in the example of FIG. 6, with regard to the front-left (L) speaker 3, no sound is detected (see the broken-line frame indicated by sign 63) after the sound emission interval 3T from the sound pickup time t10 of the sound considered to be the test sound emitted last based on the test signal sequence (the tenth test sound). Accordingly, it is determined that the determination of the sound pickup time t1 as the sound pickup time of the initial test sound was correct. If a sound were to have been detected after the sound emission interval 3T from the sound pickup time t10, the possibility would be high that the initial sound detected at sound pickup time t1 is noise. Accordingly, in this case, the sound detected next to the initial sound would be determined as the new initial sound. When, as in the present embodiment, the test sound is emitted while the speakers 3 are switched, and when the number of the emitted test sounds based on the test signal sequence is m (m is an integer such that m≥n), and the number of speakers is s (s is an integer such that s≥1), the "final test sound defined by the test signal sequence with respect to the speaker which emits the initial test sound" in the claims is the (m−s+1)th test sound.

The sound pickup time of the initial test sound determined by the initial test sound pickup time determination unit 151 may not necessarily indicate an absolute time, and may instead indicate a sound pickup timing (sound pickup period). That is, "the sound pickup time of the initial test sound" may indicate a relative time with respect to another test sound pickup timing.

Referring back to FIG. 4, the synchronous addition unit 152, with reference to the sound pickup time of the initial test sound determined by the initial test sound pickup time determination unit 151, performs synchronous addition four times (x times) for each of the speakers 3. In this way, S/N is increased and the influence of noise is decreased.

The time difference calculation unit 153 compares the information indicating the sound emission timing of the test signal sequence with the sound pickup timing of each test sound obtained from the result of addition by the synchronous addition unit 152 after the synchronous addition for each of the speakers 3, and calculates a time difference between the sound emission timing and the sound pickup timing of each test sound. The "information indicating the sound emission timing of the test signal sequence" refers to information which defines the sound emission timing of the test signal sequence. According to the present embodiment, the information is defined by the sound emission interval T. The "sound pickup timing" indicates a point in time at which the sample value has exceeded a predetermined threshold value.

Figure 7:
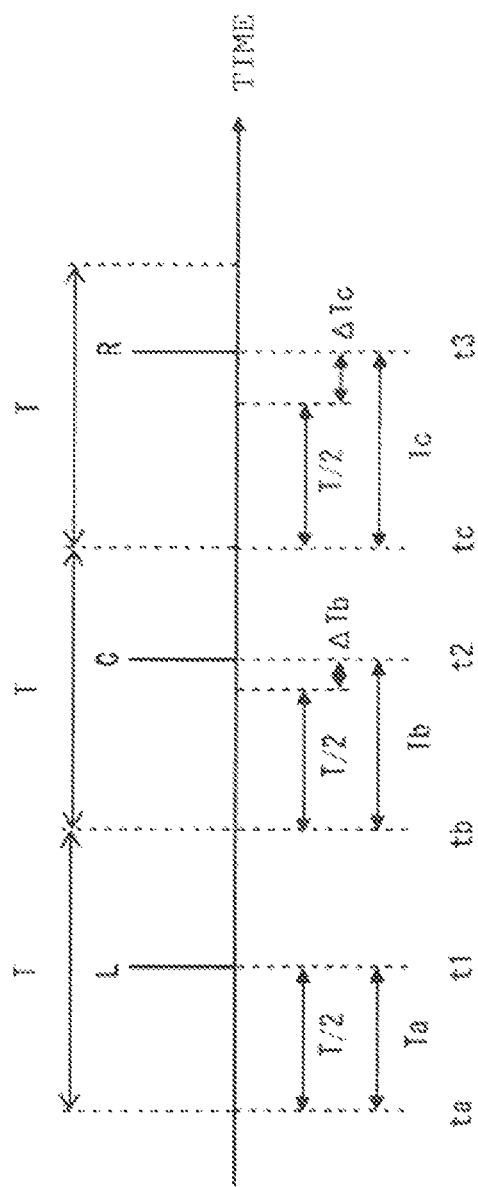
FIG. 7 is a diagram for describing a time difference calculation unit.

FIG. 7 is a diagram illustrating the test sounds (see solid lines L, C, and R) picked up at sound pickup times t1, t2, and t3 of FIG. 6. In the present embodiment, with reference to a point in time preceding the sound pickup time t1 for the initial test sound (for L) by a predetermined time, a time difference $\Delta T$ from the reference channel (L-channel) corresponding to the initial test sound is calculated. In the figure, with reference to the point in time (ta) preceding the sound pickup time t1 of the initial test sound (for L) by T/2, divided intervals are set at regular intervals T, and the start point of each of the divided intervals is indicated as ta to tc. In this case, a time length Tb from tb to the sound pickup time of the second test sound (for C) can be represented as "Tb=T/2+$\Delta$Tb". Similarly, a time length Tc from tc to the sound pickup time of the third test sound (for R) can be represented as "Tc=T/2+$\Delta$Tc". The time difference $\Delta T$ may become minus.

The adjustment information generation unit 154, based on the time difference $\Delta T$ calculated by the time difference calculation unit 153, generates adjustment information to be used for a delay process for voice signals supplied to the speakers 3. Specifically, the adjustment information is used for delaying, with reference to L-channel, C-channel by −$\Delta$Tb (i.e., the supply timing of voice signal for the C-channel is advanced by $\Delta$Tb), and delaying R-channel by −$\Delta$Tc (i.e., the supply timing of voice signal for R-channel is advanced by $\Delta$Tc). Because the supply timing cannot be advanced in practice, the adjustment information for delaying the other channels with reference to the speaker 3 with the greatest distance Ln from the smartphone 1 is generated. Specifically, in the example of FIG. 7, with reference to the speaker 3 for R, the adjustment information that causes L-channel to be delayed by ΔTc and R-channel to be delayed by (ΔTc-ΔTb) is generated.

The predetermined time may not necessarily be T/2, and may be a value obtained by multiplying the sound emission interval T by a predetermined value, such as T/3 or T/4. The predetermined time may not even be related to the sound emission interval T and may be a pre-defined value. Instead of the reference being the point in time preceding the sound pickup time of the initial test sound by a predetermined time, the reference may be a point in time preceding the sound pickup time of test sound emitted for the second time or later by a predetermined time.

Referring back to FIG. 3, the adjustment information transmission unit 160 transmits the adjustment information generated by the adjustment information generation unit 154 to the AV amplifier device 2. The adjustment information reception unit 220 of the AV amplifier device 2 receives the transmitted adjustment information. The signal processing unit 230, based on the received adjustment information, performs a delay process for the voice signals supplied to the speakers 3 (signal processing step). For example, as described above, when the speaker 3 for R is the most distant from the smartphone 1, the delay process is performed with respect to the channels corresponding to the speakers 3 for L and C.

Figure 8:
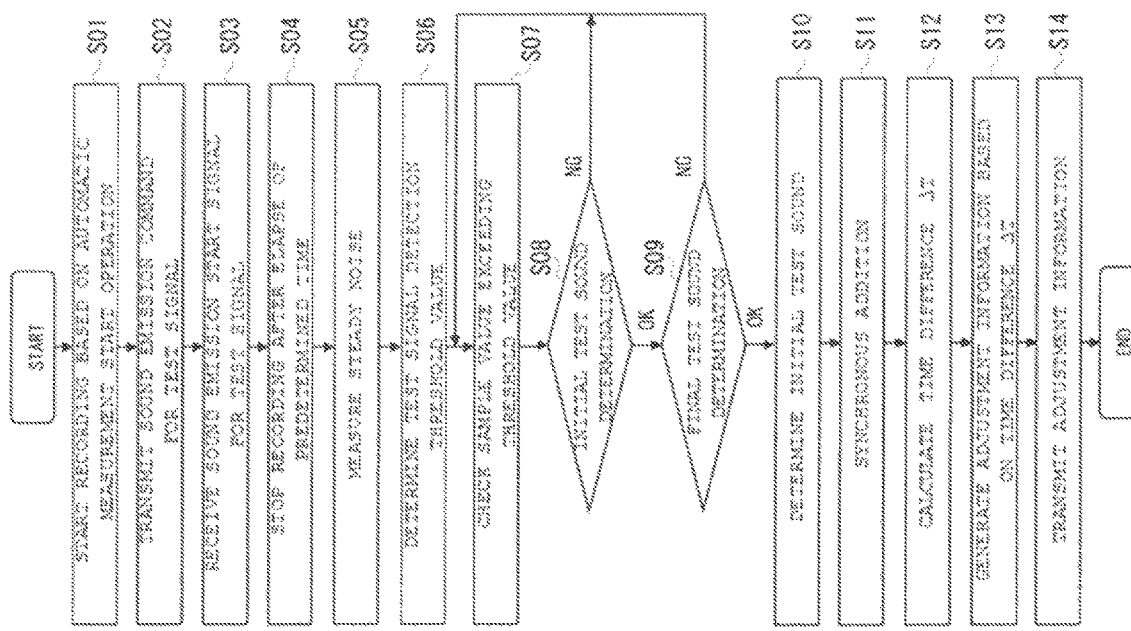
FIG. 8 is a flowchart of a process flow in a smartphone.

With reference to the flowchart of FIG. 8, the process flow of the smartphone 1 when performing sound field control will be described. The smartphone 1, based on an automatic measurement start operation with respect to the touch panel 11, starts recording (S01). The smartphone 1 then transmits a sound emission command for a test signal sequence (test signal sequence+control signal) to the AV amplifier device 2 (S02), and receives a sound emission start signal for the test signal sequence from the AV amplifier device 2 (S03). The smartphone 1 stops the recording after the elapse of a predetermined time from the reception of the sound emission start signal (S04). A configuration may be adopted in which, instead of starting the recording at S01, the recording is started after the sound emission start signal is received. In another configuration, the automatic measurement start operation at S01 may be performed with respect to the AV amplifier device 2, and the operation signal may be transmitted from the AV amplifier device 2 to the smartphone 1.

The smartphone 1, after the end of recording, measures steady noise (background noise) (S05), and determines a test sound detection threshold value (S06). For example, the threshold value is determined based on the peak value or effective value of A/D-converted sample values in the recording period. Thereafter, the sample values which exceeded the threshold value are checked (S07; see FIG. 6), and a determination is made with respect to the initial sound, i.e., the initially detected sound (S08). Herein, when sound is detected after the sound emission interval 3T from the sound pickup time of the detected initial sound, it is determined that the detected initial sound is the initial test sound (initial test sound determination "OK"). If no sound is detected after the sound emission interval 3T from the sound pickup time of the initial sound, it is determined that the detected initial sound is not the initial test sound (initial test sound determination "NG"), and the process returns to S07.

If the determination in S08 is "OK", then a determination is made with respect to the final sound (S09). Herein, if no sound is detected after the sound emission interval 3T from the sound pickup time of the test sound emitted last with respect to the speaker 3 for L (the tenth test sound in the present embodiment), it is determined that the detected initial sound is the initial test sound (final test sound determination "OK"). If a sound is detected after the sound emission interval 3T from the sound pickup time of the test sound emitted last with respect to the speaker 3 for L, it is determined that the detected initial sound is not the initial test sound (final test sound determination "NG"), and the process returns to S07.

After the initial test sound is determined in the steps S08 and S09 (S10), the synchronous addition is performed multiple times (four times in the present embodiment) for each of the speakers 3, with reference to the sound pickup time of the determined initial test sound (S11). In addition, the predetermined period (T/2 in the present embodiment) based on the information indicating the sound emission timing of the test signal sequence (sound emission interval T) and the sound pickup timing of each test sound obtained by the synchronous addition in S11 are compared to calculate the time difference ΔT between the sound emission timing and the sound pickup timing of each test sound (S12). Thereafter, the smartphone 1, based on the time difference, generates the adjustment information (S13), and transmits the adjustment information to the AV amplifier device 2 (S14). While not illustrated, the AV amplifier device 2 thereafter performs a voice signal delay process (setting of a delay amount for each channel by the DSP 22) based on the adjustment information, and, after the end of the delay process, transmits to the smartphone 1 a signal indicating the end of process. The smartphone 1, upon reception of the signal, ends the series of processes related to sound field control.

As described above, the sound field control system SY according to the present embodiment, based on the sound pickup time interval between the initial test sound and the next-emitted test sound of the test sound emitted from the same speaker 3, it is determined whether the detected initial sound is the initial test sound. Accordingly, even when the device that emits the test sound (AV amplifier device 2) and the device that picks up the sound of the test sound (smartphone 1) are separate devices, accurate measurement of the sound pickup time of the initial test sound can be performed.

In addition, according to the present embodiment, in addition to the initial test sound determination, the final test sound determination is performed to determine whether sound is detected after the elapse of the predetermined sound pickup time interval from the sound pickup time of the sound considered to be the final test sound. If the sound is determined to have been detected, it is determined that the possibility of the initial test sound that has once been determined being noise is high, and then the initial test sound determination is repeated. Accordingly, the initial test sound can be measured with increased accuracy.

In addition, according to the present embodiment, the information indicating the sound emission timing of the test signal sequence and the sound pickup timing of each test sound are compared to calculate the time difference between the sound emission timing and the sound pickup timing of each test sound. Based on the time difference, the delay process for the voice signals supplied to the speakers 3 is performed. Accordingly, even when the time between the test sound emission command and sound emission is unknown, accurate sound field control can be performed. In addition, with respect to the sound emission command from the smartphone 1 to the AV amplifier device 2, a sound emission command for the test signal sequence (entire test sounds) is issued by a single wireless communication. Accordingly, even when the communication environment of the wireless communication 5 is not stable, accurate sound field control can be implemented. Specifically, when the sound emission command is issued for each test signal, if the communication environment is unstable, the time between the sound emission command and sound emission may not become constant, resulting in a failure to accurately measure the difference in distance from each of the speakers 3 to the smartphone 1 (microphone 12). In this respect, according to the present embodiment, no such problem is encountered because the emission command for entire test sounds is issued by a single wireless communication.

The embodiment is not a limitation, and the following modifications may be adopted.

First Modification

In the embodiment, the synchronous addition unit 152 performs the synchronous addition for each of the speakers 3 as many times as the number of times of repetition of the test sound (four times in the present embodiment). However, the synchronous addition may be performed only using an intermediate value obtained by removing the maximum value and the minimum value. Specifically, instead of performing the synchronous addition using the sound pickup results for the number of times of repetition of the test sound ("x times" in the claims), synchronous addition may be performed using some of the sound pickup results (for example, the results obtained by removing results with excessively large and/or excessively small effective values). In this way, the initial test sound determination accuracy can be further increased. In a further modification, a configuration may be adopted in which no synchronous addition is performed.

Second Modification

In the embodiment, the test signal is supplied while the speakers 3 are switched. However, the test signal may be supplied to one speaker 3 multiple times continuously. That is, the test signal may be supplied as in L→L→L→L→C→C→C→C→R→R→R→R. In this case, the final test sound determination determines, with respect to the speaker 3 that emits the initial test sound (in the example, the speaker for L), whether a sound is detected after the elapse of the sound emission interval T from the sound pickup time of the test sound emitted last (the fourth test sound). Accordingly, when the speaker 3 that emits the initial test sound is switched to the other speaker 3 (in the example, between the fourth test sound and the fifth test sound), it is preferable to provide an interval (blank period) that is several times the sound emission interval of the other test sounds. In this way, the final test sound determination can be accurately performed.

Third Modification

In the embodiment, the initial test sound determination is performed for each of the speakers 3 with respect to the first test sound (initial test sound) and the next-emitted test sound. However, the initial test sound determination may be performed with respect to the test sound emitted for the third time from the same speaker 3, in addition to the next-emitted test sound. Specifically, when the test signal is supplied while the speakers 3 are switched, if the number of speakers is s (where is an integer such that s≥1), any of the first and the (s+1) th test sounds; the first and the (2s+1) th test sounds; the first and the (3s+1) th test sounds; . . . may be used. In this case, the initial test sound pickup time determination unit 151 may determine whether a sound (sound approximating the n-th test sound) is detected after the elapse of the sound emission interval between the initial test sound and the n-th (where n is an integer such that n≥2) test sound defined by the test signal sequence. Similarly, when the test signal is supplied to one speaker 3 multiple times continuously, the test sound may not necessarily be the second test sound as long as the test sound is emitted from the same speaker 3.

Fourth Modification

While in the embodiment the test sound is emitted at regular intervals, the test sound may be emitted at sound emission intervals corresponding to the characteristics of the speakers 3 used for sound emission. For example, with respect to the speaker 3 that emits sound with much reverberation, such as the subwoofer (SW), it is preferable to set a wide interval before the sound emission timing of the next test sound. In this configuration, the sound pickup time of the next test sound can be accurately detected, whereby more accurate sound field control can be implemented.

In another modification, the test sound may be emitted at a sound emission timing in accordance with certain times (such as triple time or quadruple time) or in a predetermined rhythm (such as the "rhythm of the first bar of the . . . song"). In this way, the user can be let known about ongoing sound field control while being spared from being bored.

When the test sound is not emitted at regular intervals, the initial test sound determination determines whether, based on the sound pickup time of the detected initial sound, sound is detected after the elapse of the sound emission interval from the initial test sound defined by the test signal sequence and the test sound emitted next from the same speaker 3. The final test sound determination determines whether a sound is detected after the elapse, from the sound pickup time of the final test sound defined by the test signal sequence, of the sound emission interval between the final test sound and the preceding test sound emitted from the same speaker 3.

Fifth Modification

In the embodiment, the smartphone 1 is provided with the test signal storage unit 110. However, the AV amplifier device 2 may be provided with the test signal storage unit 110. In this case, the sound emission command unit 120 of the smartphone 1 only performs the issuance of the sound emission command, and the signal supply unit 210 of the AV amplifier device 2 supplies a test signal sequence that is stored in advance to the speakers 3. In addition, the smartphone 1 acquires the test signal sequence from the AV amplifier device 2 when establishing connection or issuing a sound emission command. The analysis unit 150 compares the acquired information indicating the sound emission timing of the test signal sequence with the sound pickup timing of each test sound picked up by the sound pickup unit 130.

In a further modification, the smartphone 1 and the AV amplifier device 2 may both be provided with the test signal storage unit 110. In this case, the smartphone 1 does not need to acquire the test signal sequence from the AV amplifier device 2. The smartphone 1 may determine the device type or the number of speakers of the connected AV amplifier device 2, read from the test signal storage unit 110 the test signal sequence based on the determination result, and perform an analysis using the analysis unit 150.

Sixth Modification

In the embodiment, the analysis unit 150 is provided in the smartphone 1 (see FIG. 3). However, the analysis unit 150 may be provided in the AV amplifier device 2. In this case, the smartphone 1 may transmit recording data of the recording unit 140 (the sound pickup result of picking up a sound including the test sound sequence using the microphone 12) to the AV amplifier device 2.

Seventh Modification

In the embodiment, the time difference $\Delta T$ from the reference channel (L-channel) corresponding to the initial test sound is calculated with reference to the point in time preceding the sound pickup time t1 of the initial test sound (for L) by a predetermined time. However, from a sound pickup interval (T+$\Delta Tn$) between the n-th emitted test sound and the (n+1)th emitted test sound, a time difference $\Delta Tn$ from the sound emission interval T may be determined, and a delay amount for each channel may be calculated from the time difference $\Delta Tn$. For example, when the sound pickup time for the test sound for L is t1, the sound pickup time for the test sound for C is t2, the sound pickup time for the for test sound R is t3, and when the elapsed time from t1 to t2 is represented as "T+$\Delta T1$" and the elapsed time from t2 to t3 is represented as "T+$\Delta T2$", if the speaker 3 with the greatest distance Ln from the smartphone 1 is the speaker for L, C-channel may be delayed by "$\Delta T1$" and R-channel may be delayed by "$\Delta T1+\Delta T2$". The time difference $\Delta Tn$ may become minus.

Eighth Modification

In the embodiment, the adjustment information for performing the voice signal delay process is generated using the calculation result from the time difference calculation unit 153. However, sound field control information for allowing the user to adjust the position of the speakers 3 may be generated by the smartphone 1. For example, as the sound field control information, a message indicating the speaker 3 to be moved, the amount of movement, and the direction of movement, such as "Move the front-left speaker toward the smartphone side by 50 cm and toward the front-center speaker side by 30 cm", may be generated and displayed on the touch panel 11. Instead of the display, the message may be output in the form of voice guidance or using communication means such as electronic mail. In another modification, if the speakers 3 are self-propelled, control signals for the speakers 3 may be output as sound field control information. In this case, as the sound field control information, a control signal indicating the speaker 3 to be moved, the amount of movement, and the direction of movement may be generated. Based on the acquired sound field control information, the speakers 3 move using a self-propelled means, which is not illustrated. In this configuration, the distance from each of the speakers 3 to the smartphone 1 can be aligned without bothering the user.

Ninth Modification

In the embodiment, sound field control is implemented with respect to a plurality of speakers 3. However, the present invention may be applicable for purposes other than sound field control, such as for accurately determining the sound pickup time of the initial test sound of a test sound sequence in order to measure the frequency characteristics of the speakers 3. In such case, the number of the speakers 3 to be measured may be one.

While the main embodiment and various modifications have been described, the constituent elements of the sound field control system SY (smartphone 1, AV amplifier device 2) described in the embodiment and modifications may be provided in the form of a program. The program may be stored in various recording media (such as a CD-ROM or a flash memory) and provided. Specifically, the technical scope of the present invention includes a program for causing a computer to function as the constituent elements of the smartphone 1 or the AV amplifier device 2 (including the sound field control application in the embodiment), and a computer-readable recording medium having the program stored therein. Other modifications may be made without departing from the spirit of the present invention.

What is claimed is:

1. A sound field control system comprising:
a signal supply configured to supply a test signal sequence to speakers; and
a mobile device configured to:
detect using a microphone a test sound sequence emitted from the speakers based on the test signal sequence, and
determine a pickup time of an initial test sound included in the detected test sound sequence comprising:
detecting the initial sound of the detected test sound sequence,
determining whether a sound has been detected after a sound emission interval of time has elapsed since the sound pickup time of the detected initial sound, wherein:
the sound emmission interval is a time period between the initial test sound and an n-th (where n is an integer such that n≥2) test sound defined by the test signal sequence, and
the n-th test sound is emitted from a same speaker as the initial test sound, and
upon determining that the sound has been detected, determining the sound pickup time of the initial sound as the sound pickup time of the initial test sound; and
wherein the signal supply is additionally configured to perform a delay process for a voice signal supplied to each of the speakers based on the determined pickup time of the initial test sound.

2. The sound field control system according to claim 1, wherein the mobile device, upon determining that no sound has been detected after the elapse of the sound emission interval, from the sound pickup time of the detected initial sound, between the initial test sound and the n-th test sound, determines a sound detected next to the initial sound as new initial sound.

3. The sound field control system according to claim 2, wherein the mobile device, with respect to the speaker which emits the initial test sound, determines whether a sound has been detected after the elapse of the sound emission interval, from the sound pickup time of the final test sound defined by the test signal sequence, between the final test sound and a preceding test sound, and, upon determining that the sound has been detected, determines the sound detected next to the initial sound as a new initial sound.

4. The sound field control system according to claim 3, wherein:

the test signal sequence is configured to cause a plurality of the speakers to emit the test sound x times each (where x is an integer such that x≥2), the mobile device is further configured to, with reference to the sound pickup time of the initial test sound, perform synchronous addition for each of the speakers, using at least some of sound pickup results of the test sound emitted x times; and the signal supply performs the delay processing using the synchronous addition result.

5. The sound field control system according to claim 4, wherein:

the mobile device is further configured to compare information indicating a sound emission timing of the test signal sequence with a sound pickup timing of each test sound that is obtained from the synchronous addition result and that has been subjected to synchronous addition for each of the speakers, to calculate a time difference between the sound emission timing and the sound pickup timing of each test sound, wherein the signal supply performs the delay process based on the calculated time difference.

6. The sound field control system according to claim 5, wherein the test signal sequence is a signal sequence for emitting the test sound at regular intervals.

7. The sound field control system according to claim 6, wherein the mobile device, with reference to a point in time preceding the sound pickup time of the initial test sound by a predetermined time, calculates a time difference between a time length from a start point of each of divided intervals which are set at the regular intervals to the sound pickup time of each test sound and the predetermined time.

8. The sound field control system according to claim 5, wherein the mobile device and the signal supply are connected via wireless communication.

9. An analysis device comprising a processor configured to:

detect using a microphone a test sound sequence emitted from speakers based on a test signal sequence; and determine a pickup time of an initial test sound included in the test sound sequence comprising:

detecting the initial sound of the detected test sound sequence;

determining whether a sound has been detected after a sound emission interval of time has elapsed since the sound pickup time of the detected initial sound, wherein:

the sound emission interval is a time period between the initial test sound and an n-th (where n is an integer such that n≥2) test sound defined by the test signal sequence, and the n-th test sound is emitted from a same speaker as the initial test sound; and upon determining that the sound has been detected, determining the sound pickup time of the initial sound as the sound pickup time of the initial test sound; and output a signal based on the determined pickup time of the initial test sound to be used for performing a delay process for a voice based supplied to each of the speakers.

10. An acoustic device configured to:

supply a test signal sequence to speakers; and detect using a microphone a test sound sequence emitted from the speakers based on the test signal sequence;

determines a pickup time of an initial test sound included in the detected test sound sequence comprising:

determining whether a sound has been detected after a sound emission interval of time has elapsed since a sound pickup time of a detected initial sound, wherein:

the sound emission interval is a time period between the initial test sound and an n-th (where n is an integer such that n≥2) test sound defined by the test signal sequence, and the n-th test sound is emitted from a same speaker as the initial test sound, upon determining that the sound has been detected, determines the sound pickup time of the initial sound as the sound pickup time of the initial test sound, and perform a delay process for a voice signal supplied to each of the sneakers based on the determined pickup time of the initial test sound.

* * * * *